(12) United States Patent
Perry

(10) Patent No.: US 12,729,635 B2
(45) **Date of Patent: *Sep. 8, 2026**

(54) CARRIER-LESS SPRING LOADED PLANETARY GEARSET USED WITH eVCT

(71) Applicant: BorgWarner Inc., Auburn Hills, MI (US)

(72) Inventor: Douglas W. Perry, Interlaken, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/043,227

(22) Filed: Jan. 31, 2025

(65) Prior Publication Data

US 2026/0226852 A1 Aug. 6, 2026

(51) Int. Cl.

*F01L 1/352* (2006.01)
*F01L 1/047* (2006.01)
*F01L 9/22* (2021.01)
*F16H 1/28* (2006.01)

(52) U.S. Cl.

CPC ............... *F01L 1/352* (2013.01); *F01L 1/047* (2013.01); *F01L 9/22* (2021.01); *F16H 1/2836* (2013.01)

(58) Field of Classification Search

CPC ...................................................... F01L 1/352

See application file for complete search history.

(56) References Cited

U.S. PATENT DOCUMENTS 2,005,740 A 6/1935 Harris
3,330,171 A 7/1967 Nasvytis
3,540,311 A 11/1970 Chillson
4,193,325 A 3/1980 Cotreau
4,252,034 A 2/1981 DeBruyne
4,459,876 A 7/1984 Kohler et al.
4,873,894 A 10/1989 Avery et al.
5,240,462 A 8/1993 Mochizuki et al.
5,409,431 A 4/1995 Vranish
5,540,630 A 7/1996 Vranish
7,387,588 B2 6/2008 Bader (Continued)

FOREIGN PATENT DOCUMENTS

CN 100402887 C 7/2008
EP 0559626 B1 2/1997
JP 2922476 B2 7/1999

OTHER PUBLICATIONS

Yolkov, G. Yu, et al.; Calculation of the Efficiency of the Planetary Gear K-V-V without a Carrier; IOP Conference Series: Materials Science and Engineering; dated 2019 (7 pages).

(Continued)

*Primary Examiner* — Laert Dounis

(74) *Attorney, Agent, or Firm* — Reising Ethington P.C.

(57) ABSTRACT

An electrically-actuated variable camshaft timing (VCT) assembly including a gearbox assembly, having a sun gear, and a plurality of planet gears in meshing engagement with the sun gear, each of the plurality of planet gears including a ball socket at a radial gear face; and a rolling ball received within the ball socket, wherein the planet gears rotate about the rolling ball, and are configured to engage a ramped surface within the VCT assembly that moves the planet gears radially outwardly from an axis of gearbox assembly rotation.

11 Claims, 6 Drawing Sheets

(56) References Cited

U.S. PATENT DOCUMENTS

| | | | | |
|---|---|---|---|---|
| 9,140,331 | B2 | 9/2015 | Frank | |
| 9,523,353 | B2 | 12/2016 | Frank | |
| 9,664,254 | B2 | 5/2017 | McCloy | |
| 10,443,689 | B2 | 10/2019 | Hansson | |
| 10,837,520 | B2 | 11/2020 | Klassen et al. | |
| 10,941,838 | B2 | 3/2021 | Georgiev et al. | |
| 11,542,842 | B2 | 1/2023 | McCloy et al. | |
| 11,781,451 | B2 | 10/2023 | Perry et al. | |
| 11,852,053 | B2 * | 12/2023 | McCloy | F01L 9/22 |
| 2022/0372896 | A1 * | 11/2022 | McCloy | F01L 1/352 |

OTHER PUBLICATIONS

Höhn; B. R., et al.; A Wolfrom Transmission without Carrier; Power Transmissions; dated 2020 (7 pages).

Yang; Xiadong, et al.; A Refined Dynamic Model for the Planetary Gear Set Considering the Time-Varying Nonlinear Support Stiffness of Ball Bearing; dated Feb. 1, 2023 (36 pages).

* cited by examiner 22
(x)
56
40
34
24
40
60
$(x_1)$
42
38
42
48
62
36a
36b
52
16
54
58
26
28
20
12
18

(x)
66
62
16
106
28
24
24
42
42
12
26
56
54
58

(x)
16
28
24
24
68
68
42
42
42
24
68
42
12
26
54
56
58

CARRIER-LESS SPRING LOADED PLANETARY GEARSET USED WITH eVCT

TECHNICAL FIELD

The present application relates to internal combustion engines (ICEs) and, more particularly, to variable camshaft timing used with ICEs.

BACKGROUND

Modern internal combustion engines often include variable valve timing (VVT) mechanisms to advance or retard ignition timing depending on the momentary operating conditions the ICE is experiencing. Variable camshaft timing (VCT) assemblies, sometime referred to as camshaft phasers, can be used to vary ICE ignition timing and typically may be actuated using hydraulic fluid or an electric motor. With respect to electrically-actuated VCT assemblies, the electric motor can be coupled to a gearbox assembly that varies the angular position of the crankshaft relative to the camshaft. It would be helpful to simplify a gearbox assembly configuration while simultaneously maintaining or increasing reliability.

SUMMARY

In one implementation, an electrically-actuated variable camshaft timing (VCT) assembly includes a gearbox assembly, having a sun gear, and a plurality of planet gears in meshing engagement with the sun gear, each of the plurality of planet gears including a ball socket at a radial gear face; and a rolling ball received within the ball socket, wherein the planet gears rotate about the rolling ball, and are configured to engage a ramped surface within the VCT assembly that moves the planet gears radially-outwardly from an axis of gearbox assembly rotation.

In another implementation, an electrically-actuated VCT assembly, includes a gearbox assembly, having a sun gear and a plurality of planet gears, in meshing engagement with the sun gear, each of the plurality of planet gears including a ball socket at a radial gear face and another ball socket at an opposite radial gear face; a camshaft plate, configured to couple to a camshaft of an internal combustion engine, having a ramped surface; an end plate, axially slidable relative to the camshaft plate, having another ramped surface; and rolling balls received within the ball sockets, wherein the planet gears rotate about the rolling balls, and the rolling balls abut the ramped surfaces to move the planet gears radially-outwardly from an axis of gearbox assembly rotation.

In another implementation, an electrically-actuated VCT assembly, a gearbox assembly, having a first ring gear, a second ring gear, a sun gear, and a plurality of planet gears that engage the first ring gear, the second ring gear, and the sun gear, wherein each of the plurality of planet gears includes a ball socket at a radial gear face and another ball socket at an opposite radial gear face; a camshaft plate, configured to couple to a camshaft of an internal combustion engine, having a ramped surface; an end plate, axially slidable relative to the camshaft plate, having another ramped surface; a Belleville washer, fixed to a portion of the VCT assembly and abutting a surface of the end plate, axially biasing the end plate towards the camshaft plate; and rolling balls received within the ball sockets, wherein the planet gears rotate about the rolling balls, and the rolling balls abut the ramped surfaces to move the planet gears radially-outwardly from an axis of gearbox assembly rotation.

DETAILED DESCRIPTION

An electrically-actuated variable camshaft timing (VCT) assembly can include a planetary gearbox assembly having a plurality of planet gears each rotating about at least one rolling ball without use of a planetary gear carrier or planetary gear shaft. The rolling ball can be biased axially along an axis of gearbox rotation causing the planet gears to move radially-outwardly into meshing engagement with ring gears for varying an angular position of the camshaft relative to the crankshaft of the ICE. The VCT assembly can include a sun gear, two ring gears, and planet gears meshingly engaging the sun gear and ring gears. Each planet gear can lack a stud or shaft usually provided by the planetary gear carrier, but instead use at least one rolling ball at least partially fitting within a central aperture of the planet gear. The planet gears can be confined between a camshaft plate with a ramped surface on a radial end engaging one rolling ball within the planet gear and an end plate having a ramped surface facing the camshaft plate engaging another rolling ball within the planet gear. The ramped surfaces engage the rolling balls positioned within the planet gears and at least one of these ramped surfaces is angled to exert force on the rolling ball and bias the planet gear radially outwardly into engagement with the ring gears.

In one implementation, the VCT assembly can include a Bellville washer that exerts axial force along an axis of gearbox rotation (x) on the end plate thereby moving the rolling balls closer together along the axis of gearbox rotation (x). The ramped surfaces can have a slope that contacts the rolling balls and bias the planet gears toward the ring gears. The end plate can be moveable axially along the axis of gearbox rotation (x) by the outer Belleville washer fixed to a crankshaft ring gear. However, it should be appreciated that that the spring force applied by the Belleville washer can be created by and integral to the end plate without a separate Belleville washer.

Figure 1:
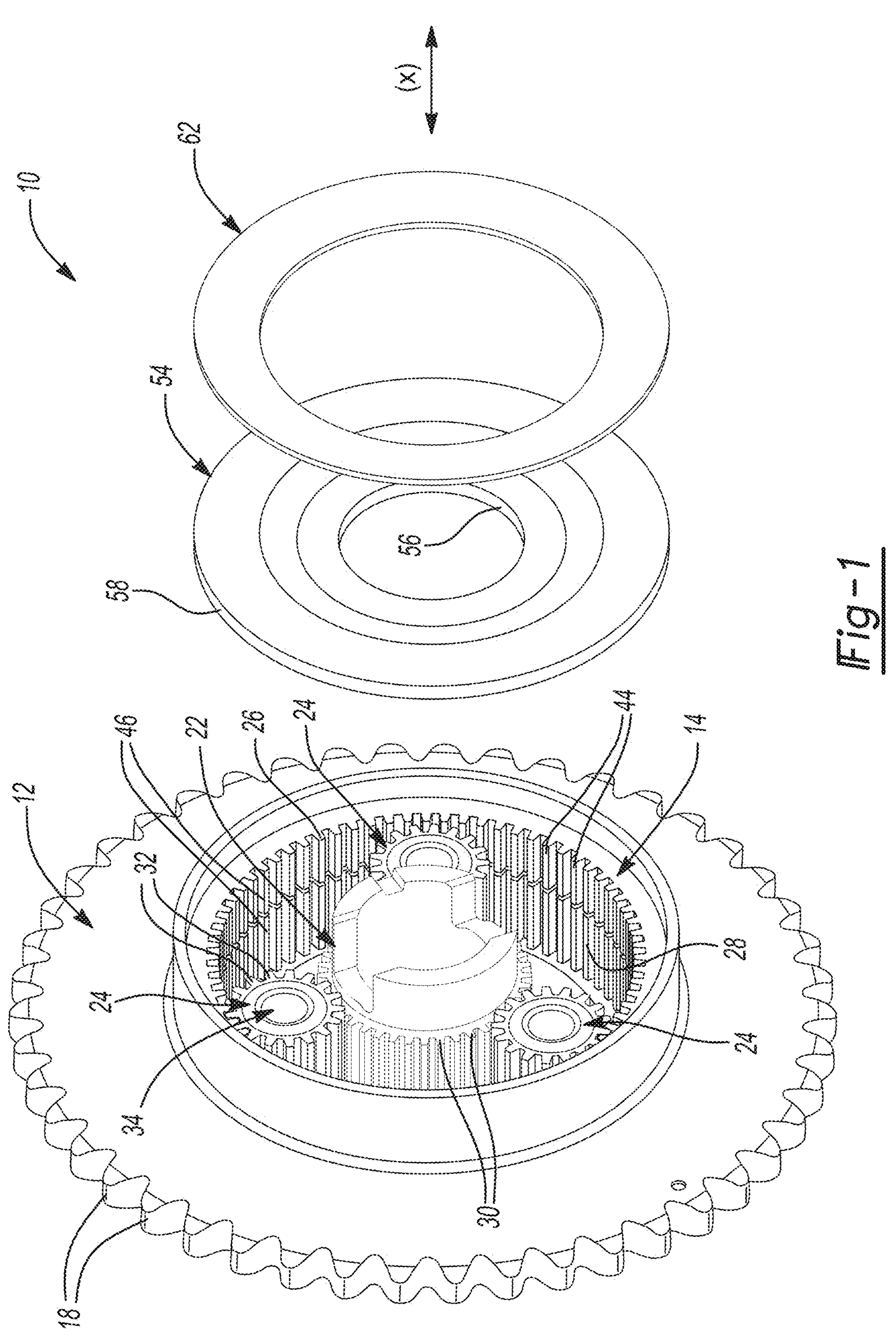
FIG. 1 is an exploded view of an implementation of a variable camshaft timing (VCT) assembly.
Figure 2:
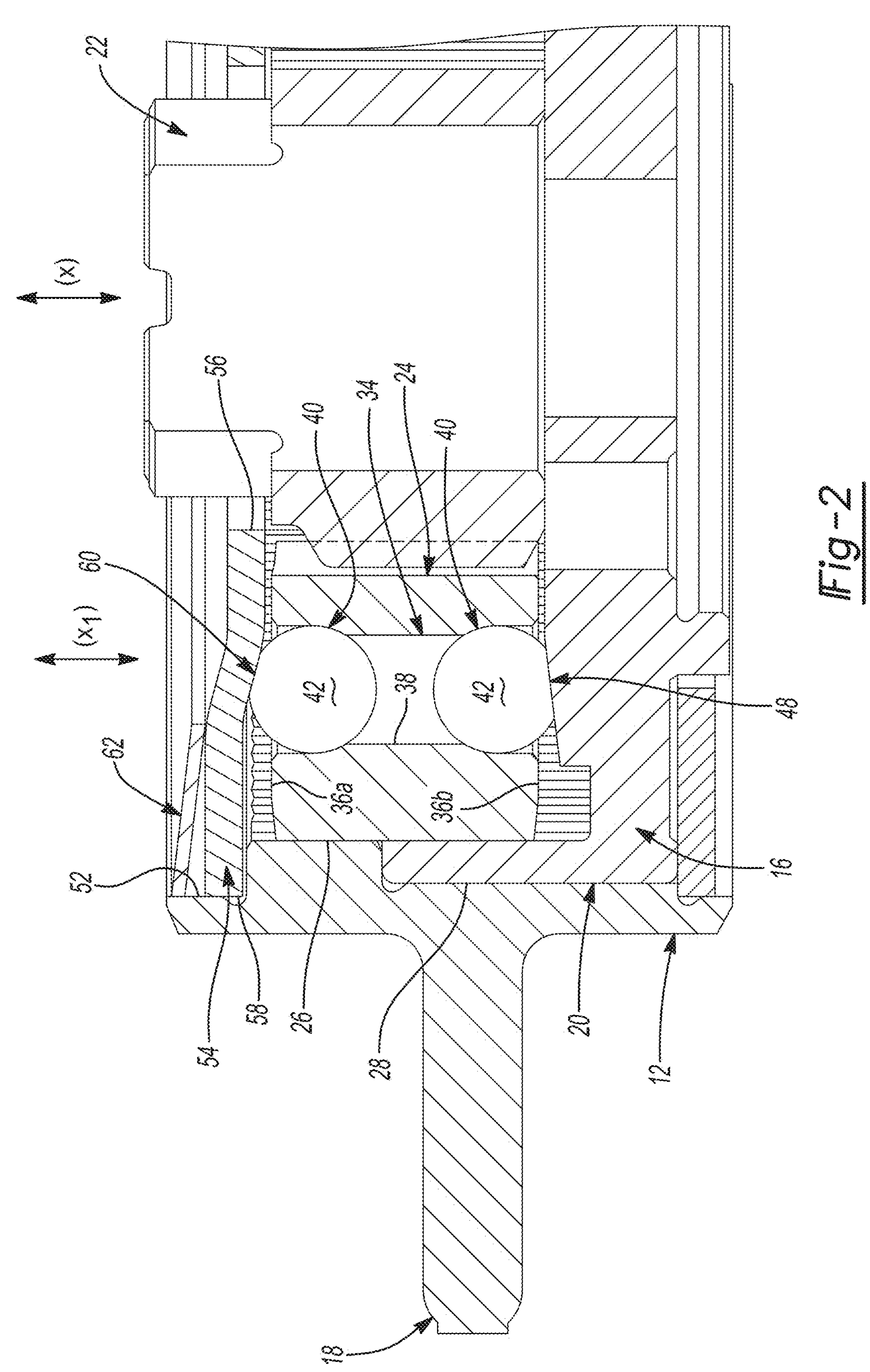
FIG. 2 is a cross-sectional view of an implementation of a VCT assembly.

FIGS. 1 and 2 depict an implementation of a VCT assembly 10*a*. VCT assemblies can have various designs and constructions in various embodiments depending upon, among other possible factors, the application in which the VCT assembly is employed and the crankshaft and camshaft that it works with. In the implementation shown here, for example, the VCT phaser assembly 10*a* includes a sprocket 12, the planetary gear set 14, and a camshaft plate 16. The example of FIG. 1 is used, in general, for describing components of an example of a VCT assembly. The VCT assembly 10*a* can have more, less, and/or different components than those described herein. In FIG. 1, the sprocket 12 receives rotational drive input from a crankshaft (not shown) and rotates about an axis of gearbox rotation (x). A timing chain or timing belt can be looped around the sprocket 12 and around a nose of the crankshaft so that rotation of the crankshaft translates into rotation of the sprocket 12. In this example, at an exterior the sprocket 12 a set of teeth 18 are circumferentially positioned around the circumference of the sprocket 12 for mating with the timing chain (or timing belt). Further, the sprocket 12 has a cylindrical wall 20 for receiving the camshaft plate 16 concentrically within the sprocket 12. The camshaft plate 16 can be connected to the camshaft of the ICE and drives rotation of the ICE's camshaft about the axis of gearbox assembly rotation (x).

Referring to FIG. 1, the planetary gear set 14 includes a sun gear 22, planet gears 24, and a first ring gear 26 and a second ring gear 28. The sun gear 22 can be connected to an electric motor (not shown) and is driven by the electric motor for rotation about the axis of gearbox rotation (x). The connection between the sun gear 22 and the electric motor can be made via a pin and slot interconnection or some other way. The sun gear 22 engages with the planet gears 24 and has a set of teeth 30 at its exterior for making direct teeth-to-teeth meshing with the planet gears 24. The planet gears 24 rotate about their individual rotational axes ($x_1$) when in the midst of bringing the camshaft of the ICE to and from its advanced and retarded angular positions. When not advancing or retarding, on the other hand, the planet gears 24 revolve together around the axis of gearbox rotation (x) with the sun gear 22 and with the ring gears 26, 28. In the embodiment presented here, there are a total of three planet gears 24 that are similarly designed and constructed, but there could be other quantities of planet gears such as two or four or six. Each planet gear 24 engages with the first and second ring gears 26, 28, and each planet gear 24 has a set of teeth 32 at its exterior for making direct teeth-to-teeth meshing with the ring gears 26, 28. Together, the two ring gears 26, 28 constitute a split ring gear construction of the planetary gear set 14. The number of individual teeth between the first and second ring gears 26, 28 can differ such as by a multiple of the number of planet gears 24 present in the planetary gear set 14. Satisfying this relationship furnishes the advancing and retarding capabilities by imparting relative rotational movement and relative speed between the first and second ring gears 26, 28.

The planet gears 24 include a central aperture 34 extending from one radial gear face 36*a* along the axis ($x_1$) to another opposite radial gear face 36*b*. The central aperture can be defined along a portion of the axis ($x_1$) by an inner diameter 38 of the planet gear 24. Ball sockets 40 can be positioned proximate the radial gear face 36 of the planet gear 24 at least partially defining the central aperture 34. The ball sockets 40 can have radiused surfaces shaped to receive and closely conform to an outer surface of rolling balls 42 that fit at least partially within the central aperture 34. In that way, the rolling balls 42 extend outside of the radial gear face 36 of the planet gears 24 but the close fit between the rolling balls 42 and the ball sockets 40 is such that movement of the rolling balls 42 relative to the axis of gearbox rotation (x) translates to movement of the planet gears 24 relative to the axis of gearbox rotation (x). Further, the rolling balls 42 can engage ramped surfaces of the VCT assembly 10*a* such that the planet gears 24 rotate about the rolling balls 42 rather than a shaft received within the planet gear and/or a planet gear carrier that may be used to support the planet gears. The rolling balls 42 can be implemented using spherical ball bearings, such as those formed from stainless steel. However, spheres made from other materials are possible.

The first ring gear 26 receives rotational drive input from the sprocket 12 so that the first ring gear 26 and sprocket 12 rotate together about the axis of gearbox rotation (x) in operation. In this embodiment the first ring gear 26 is a unitary extension of the sprocket 12, but the components could be discrete and connected together in other embodiments such as by bolts, welds, interfitting cutouts and tabs, and/or some other way. The first ring gear 26 engages with the planet gears 24 and has a set of teeth 44 at its interior for making direct teeth-to-teeth meshing with the planet gears 24. The second ring gear 28 drives rotation of the camshaft plate 16 and the two components rotate together about the axis of gearbox assembly rotation (x) in operation. In this embodiment the second ring gear 28 is a unitary extension of the camshaft plate 16, but the components could be discrete and connected together in other embodiments such as by bolts, welds, interfitting cutouts and tabs, and/or some other way. The second ring gear 28 engages with the planet gears 24 and has a set of teeth 46 at its interior for making direct teeth-to-teeth meshing with the planet gears 24. The camshaft plate 16 includes a ramped surface 48 extending along a radial end of the camshaft plate 16. The ramped surface 48 is angled or sloped extending from the axis of gearbox assembly rotation (x) toward the second ring gear 28 and engages one of the rolling balls 42.

The sprocket 12 can include an end plate recess 52 that concentrically receives an end plate 54 within the sprocket 12 and permits the end plate 54 to slide axially along the axis of gearbox assembly rotation (x). The end plate 54 can have an inner diameter 56 and an outer diameter 58 that are linked by a ramped surface 60. The inner diameter 56 can be axially offset from the outer diameter 58 along the axis of gearbox assembly rotation (x) based on the amount of angle of the ramped surface. In one implementation, angle of the ramped surface can be set at 45 degrees. However, it should be appreciated that this angle can be adjusted based on a desired axial/radial force balance. The ramped surface 60 can engage the other of the rolling balls 42 received within the planet gears 24. The ramped surface 60 can extend circumferentially around a radial surface of the end plate 54 so that as the planet gears 24 rotate to change the angular position of the camshaft plate 16 relative to the sprocket 12, the ramped surface 60 can maintain contact with the roller balls 42. The end plate 54 can be axially positioned in between the planet gears 24 and a Belleville washer 62. The Belleville washer 62 can be fixed to the sprocket 12 such that the Belleville washer 62 can exert axial force along the axis of gearbox assembly rotation (x) to move the end plate 54 toward the planet gears 24. The Belleville washer 62 can be roll-formed to create a desired height thereby establishing a particular biasing force.

A degree of compliance is introduced into the design and construction of the planet gears 24 to prevent unwanted backlash, such that the planet gears 24, rotating about the rolling balls 42, can move relative to the ramped surfaces 48, 60 of the camshaft plate 16 and the end plate 54, respectively, to minimize the unwanted backlash. In this implementation, the end plate 54 can be axially biased along the axis of gearbox assembly rotation (x) relative to the sprocket 12 such that the ramped surfaces 48, 60 move along the axis (x) closer to each other thereby forcing the rolling balls 42 and the planet gears 24 radially outwardly away from the axis of gearbox assembly rotation (x) into engagement with the first ring gear 26 and the second ring gear 28. The end plate 54 in this implementation can be axially biased in the direction of the axis of gearbox assembly rotation (x) into engagement with the rolling balls 42 via the Belleville spring 62. However, other implementations can fix the end plate 54 relative to the sprocket 16 and the end plate can include a biasing element integrally formed with the end plate that moves the ramped surfaces nearer each other along the axis of gearbox assembly rotation (x). The biasing force urges a tauter teeth-to-teeth meshing among the planet gears 24 and the first and second ring gears 26, 28.

Figure 3:
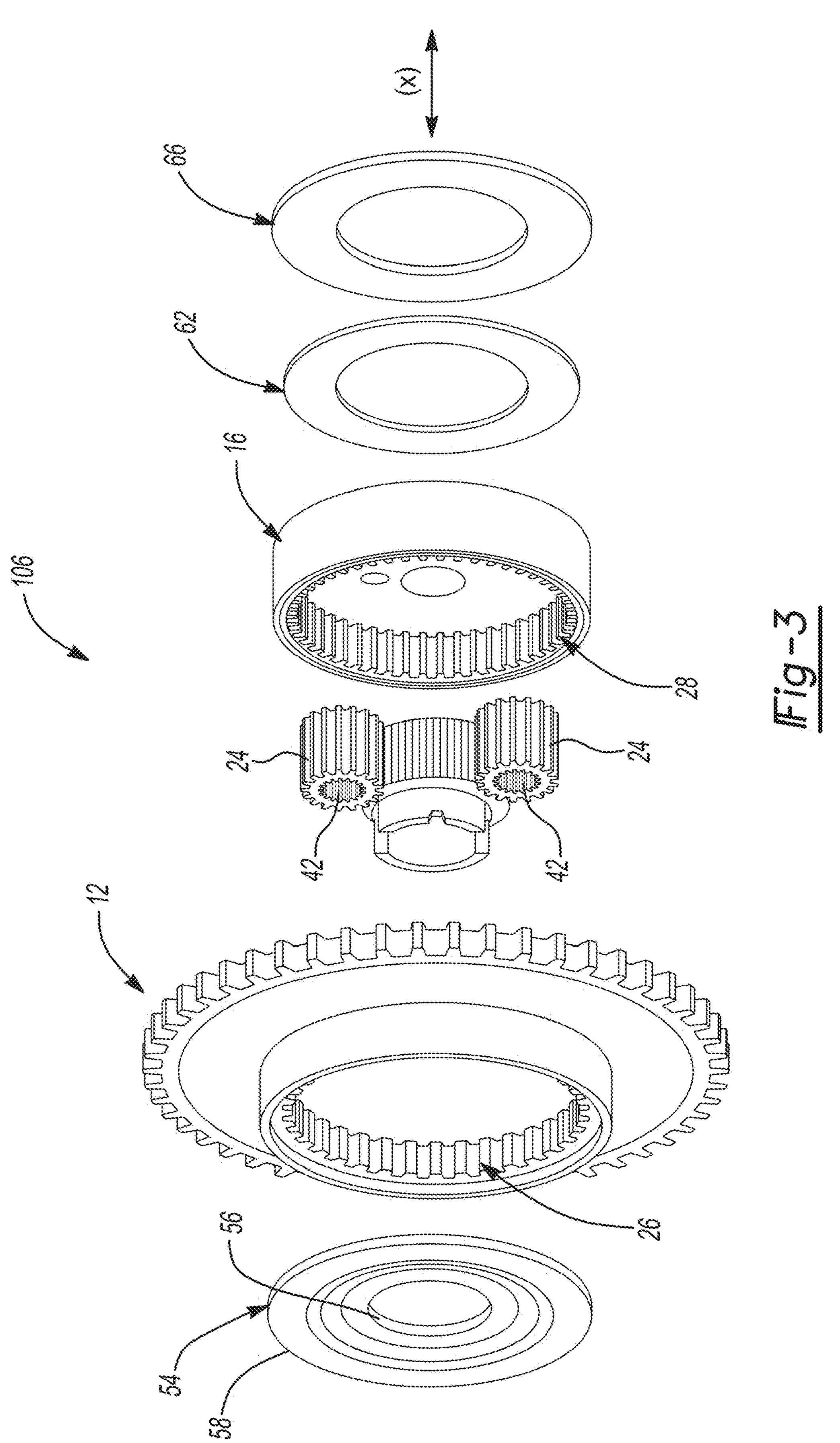
FIG. 3 is an exploded view of another implementation of a VCT assembly.
Figure 4:
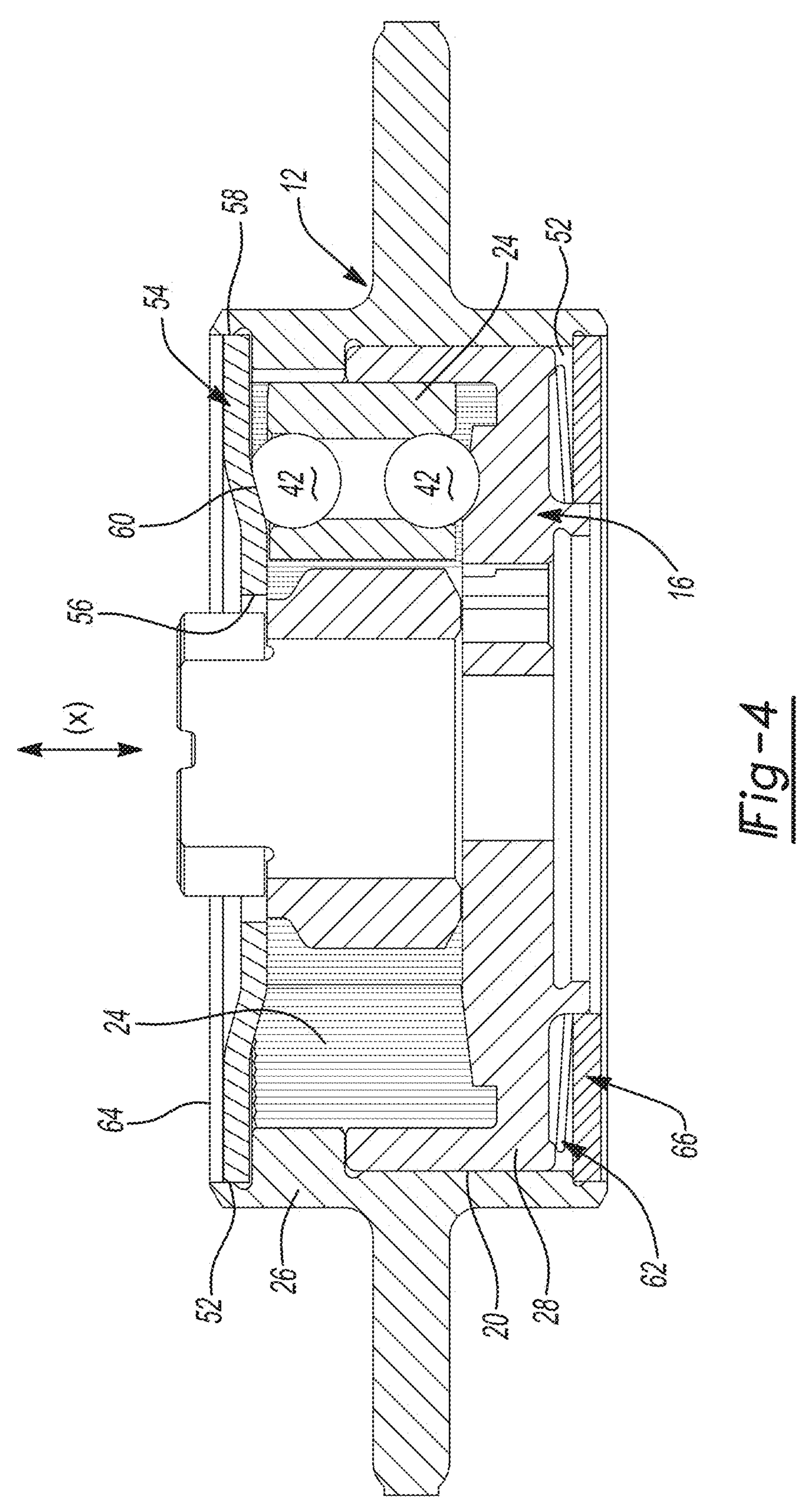
FIG. 4 is a cross-sectional view of another implementation of a VCT assembly.

Another implementation of a VCT assembly 10*b* is shown in FIGS. 3 & 4. In this implementation, the end plate 54, having a ramped surface 60, can be fixed axially relative to the axis of gearbox assembly rotation (x) while the camshaft plate 16 can be biased axially toward the end plate 54 thereby acting on the rolling balls 42 of the planet gears 24 directing force into the ramped surface 60 and moving the planet gears 24 radially outwardly into the first and second ring gears 26, 28. The camshaft plate 16 can lack a ramped surface that engages with the rolling balls 42, instead having a surface that is substantially perpendicular to the axis of gearbox assembly rotation (x).

The VCT assembly 10*b* includes a sprocket 12 having an end plate recess 52 that concentrically receives the end plate 54 within the sprocket 12. In this implementation, the end plate 54 is constrained relative to the sprocket 12 preventing the axial movement of the end plate relative to the sprocket 12 along the axis of gearbox assembly rotation (x). The end plate 54 can have an inner diameter 56 and an outer diameter 58 that are linked by a ramped surface 60. The inner diameter 56 can be axially offset from the outer diameter 58 along the axis of gearbox assembly rotation (x) based on the amount of angle of the ramped surface. In this implementation, the end plate 54 can be axially constrained relative to the sprocket 12 by a retaining plate 64. Axially spaced from the end plate 54, the camshaft plate 16 can be received within and abut the cylindrical wall 20 such that the camshaft plate 16 can move axially along the axis of gearbox assembly rotation (x). A camshaft retainer plate 66 can compress a Belleville washer 62 against the camshaft plate 16 biasing the camshaft plate 16 towards the planet gears 24.

Figure 5:
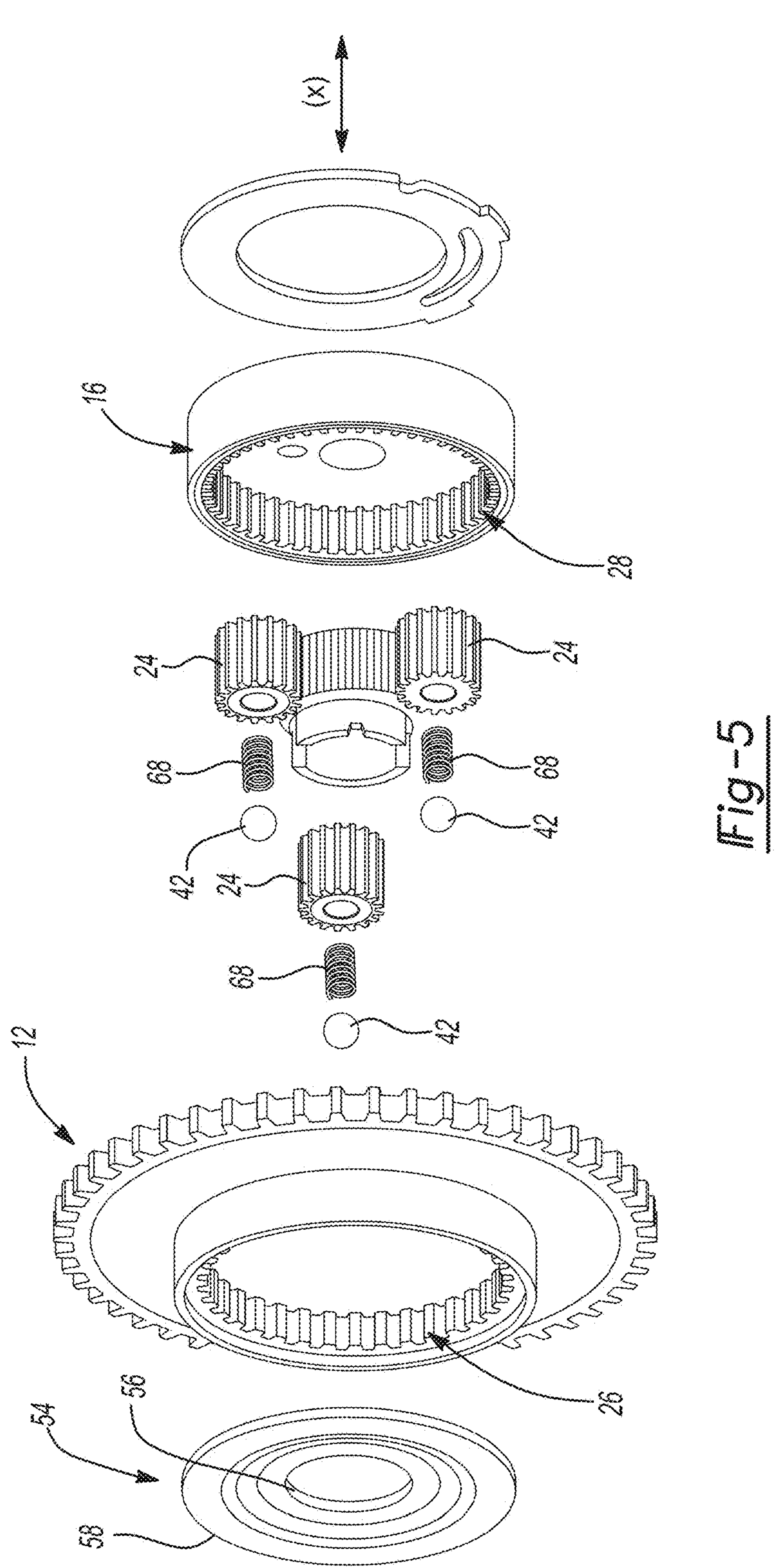
FIG. 5 is an exploded view of another implementation of a VCT assembly.
Figure 6:
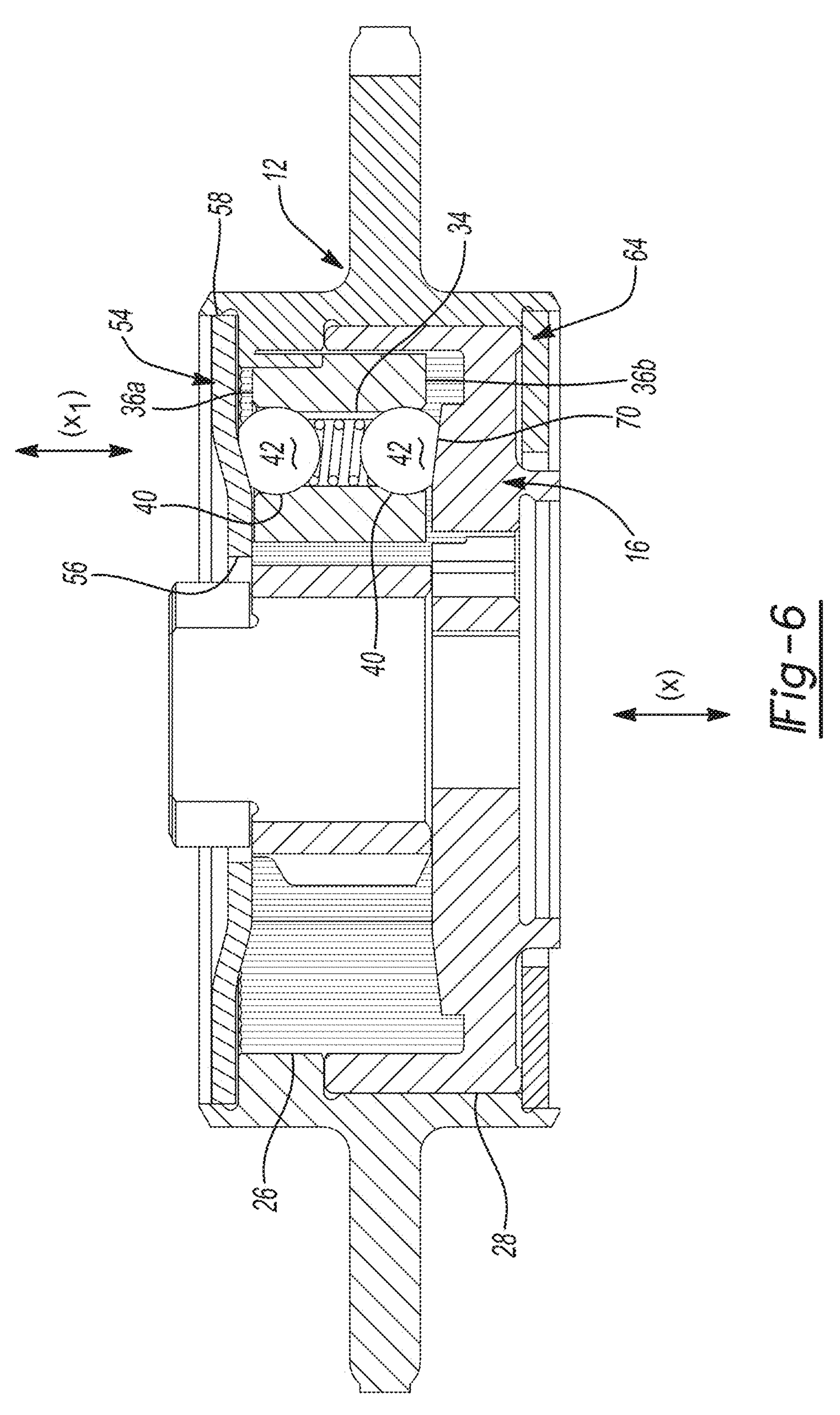
FIG. 6 is a cross-sectional view of another implementation of a VCT assembly.

Turning to FIGS. 5 and 6, a VCT assembly 10*c* includes a sprocket 12 having a having an end plate recess 52 that concentrically receives the end plate 54 within the sprocket 12. In this implementation, the end plate 54 is constrained relative to the sprocket 12 preventing the axial movement of the end plate relative to the sprocket 12 along the axis of gearbox assembly rotation (x). The end plate 54 can have an inner diameter 56 and an outer diameter 58 that are linked by a ramped surface 60. The inner diameter 56 can be axially offset from the outer diameter 58 along the axis of gearbox assembly rotation (x) based on the amount of angle of the ramped surface. In this implementation, the end plate 54 can be axially constrained relative to the sprocket 12 by a retaining plate 64. Axially spaced from the end plate 54, the camshaft plate 16 can be received within and abut the cylindrical wall 20 such that the camshaft plate 16 is constrained or fixed axially along the axis of gearbox assembly rotation (x). The camshaft plate 16 can include an axially-facing ramped surface 70 that can abut the rolling balls 42. The planet gears 24 include a central aperture 34 extending from one radial gear face 36*a* along the axis ($x_1$) to another opposite radial gear face 36*b*. The central aperture can be defined along a portion of the axis ($x_1$) by an inner diameter 38 of the planet gear 24. Ball sockets 40 can be positioned proximate the radial gear face 36 of the planet gear 24 at least partially defining the central aperture 34. The ball sockets 40 can have radiused surfaces shaped to receive and closely conform to an outer surface of rolling balls 42 that fit at least partially within the central aperture 34. In that way, the rolling balls 42 extend outside of the radial gear face 36 of the planet gears 24 but the close fit between the rolling balls 42 and the ball sockets 40 is such that movement of the rolling balls 42 relative to the axis of gearbox rotation (x) translates to movement of the planet gears 24 relative to the axis of gearbox rotation (x). Coil springs 68 can be received within the central aperture 34 such that ends of the coil spring 68 each abut a rolling ball 42. The coil springs 68 can exert force axially along the axis (x1) thereby urging the rolling balls into the ramped surfaces 60, 70 and the planet gears radially-outwardly away from the axis of gearbox assembly rotation (x) and towards the first ring gear 26 and the second ring gear 28. The term "coil spring" should be interpreted as a biasing element exerting force in opposite linear directions and should not be limited to the particular coil shape shown in the figures.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electrically-actuated variable camshaft timing (VCT) assembly, comprising:

a gearbox assembly, having a sun gear, and a plurality of planet gears in meshing engagement with the sun gear, each of the plurality of planet gears including a ball socket at a radial gear face;

a rolling ball received within the ball socket, wherein the planet gears rotate about the rolling ball, and are configured to engage a ramped surface within the VCT assembly that moves the planet gears radially-outwardly from an axis of gearbox assembly rotation; and an end plate that slides axially along the axis of gearbox assembly rotation, wherein the ramped surface is positioned radially between an inner diameter of the end plate and an outer diameter of the end plate such that the ramped surface extends circumferentially around the end plate.

2. The electrically-actuated VCT assembly recited in claim 1, wherein the end plate is received within an end plate recess formed in the VCT assembly.

3. The electrically-actuated VCT assembly recited in claim 1, wherein the plurality of planet gears each include a central aperture extending between the ball socket and another ball socket.

4. The electrically-actuated VCT assembly recited in claim 1, further comprising a first ring gear and a second ring gear that both engage the plurality of planet gears.

5. The electrically-actuated VCT assembly recited in claim 1, further comprising a Belleville washer that biases the ramped surface toward the rolling ball.

6. An electrically-actuated variable camshaft timing (VCT) assembly, comprising:

a gearbox assembly, having a sun gear and a plurality of planet gears, in meshing engagement with the sun gear, each of the plurality of planet gears including a ball socket at a radial gear face and another ball socket at an opposite radial gear face;

a camshaft plate, configured to couple to a camshaft of an internal combustion engine, having a ramped surface;

an end plate, axially slidable relative to the camshaft plate, having another ramped surface; and rolling balls received within the ball sockets, wherein the planet gears rotate about the rolling balls, and the rolling balls abut the ramped surfaces to move the planet gears radially-outwardly from an axis of gearbox assembly rotation.

7. The electrically-actuated VCT assembly recited in claim 6, wherein the plurality of planet gears each include a central aperture extending between the ball socket and the another ball socket.

8. The electrically-actuated VCT assembly recited in claim 6, further comprising a first ring gear and a second ring gear that both engage the plurality of planet gears.

9. The electrically-actuated VCT assembly recited in claim 6, further comprising a Belleville washer that biases one of the ramped surfaces toward the rolling ball.

10. An electrically-actuated variable camshaft timing (VCT) assembly, comprising:

a gearbox assembly, having a first ring gear, a second ring gear, a sun gear, and a plurality of planet gears that engage the first ring gear, the second ring gear, and the sun gear, wherein each of the plurality of planet gears includes a ball socket at a radial gear face and another ball socket at an opposite radial gear face;

a camshaft plate, configured to couple to a camshaft of an internal combustion engine, having a ramped surface;

an end plate, axially slidable relative to the camshaft plate, having another ramped surface;

a Belleville washer, fixed to a portion of the VCT assembly and abutting a surface of the end plate, axially biasing the end plate towards the camshaft plate; and rolling balls received within the ball sockets, wherein the planet gears rotate about the rolling balls, and the rolling balls abut the ramped surfaces to move the planet gears radially-outwardly from an axis of gearbox assembly rotation.

11. The electrically-actuated VCT assembly recited in claim 10, wherein the plurality of planet gears each include a central aperture extending between the ball socket and the another ball socket.

* * * * *